Dec. 27, 1949  G. DURST ET AL  2,492,851
METHOD OF SOLDERING CHAIN LINKS
Filed Aug. 21, 1946  2 Sheets-Sheet 1
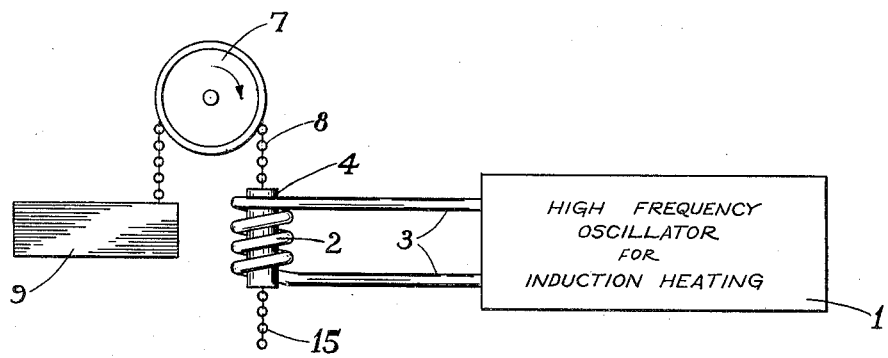
Fig. 1.
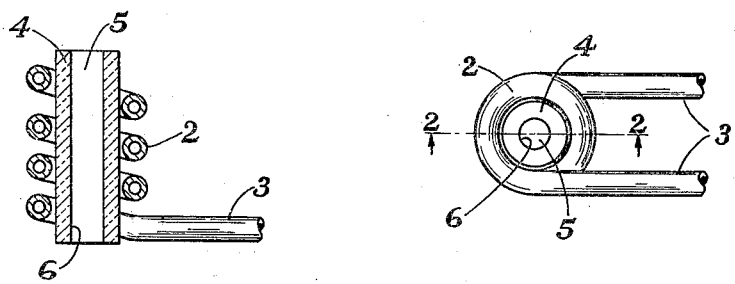
Fig. 2.  Fig. 3.
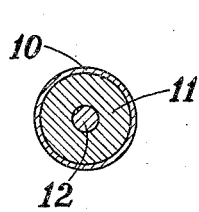  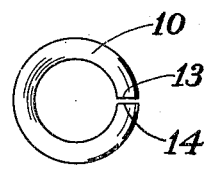
Fig. 4.  Fig. 5.
George Durst,
Jack C. Van Ryn,
Inventors.
Haynes and Koenig
Attorneys.

Dec. 27, 1949   G. DURST ET AL   2,492,851
METHOD OF SOLDERING CHAIN LINKS

Filed Aug. 21, 1946   2 Sheets-Sheet 2

George Durst,
Jack C. Van Ryn,
   Inventors.
Haynes and Koenig,
   Attorneys.

Patented Dec. 27, 1949

2,492,851

UNITED STATES PATENT OFFICE 2,492,851

METHOD OF SOLDERING CHAIN LINKS

George Durst, Attleboro, Mass., and Jack C. Van Ryn, Woodstock, N. Y., assignors to Metals & Controls Corporation, Attleboro, Mass., a corporation of Massachusetts Application August 21, 1946, Serial No. 692,082

4 Claims. (Cl. 219—12)

The present invention is concerned with the manufacture of chain, and more particularly with an improvement in the method of soldering chain links.

One object of the invention is the provision of a rapid, clean and economical method of soldering or brazing chain links; another object of the invention is the provision of a method of soldering or brazing chain links requiring less reliance on human skill than hitherto known methods; a further object is the provision of a method of soldering or brazing chain links without the necessity of using a separate source of reducing or inert gas during the soldering or brazing operation; a further object is the provision of a method of soldering or brazing chain links, which results, at the end of the soldering operation, in chain links which are bright and clean without the necessity of pickling and cleaning operations after the soldering operation. Other objects and advantages will be in part obvious and in part pointed out hereinafter.

The invention accordingly comprises the steps and sequence of steps and features of operation which will be exemplified in the methods hereinafter described, and the scope of the application of which will be indicated in the following claims.

For a fuller understanding of the nature and objects of the invention as well as for specific fulfillment thereof, reference should be had to the following detailed description taken in connection with the accompanying drawings, in which:

Fig. 1 is a schematic drawing of one form of apparatus which will accomplish the objects of this invention;

Fig. 2 is a cross section elevation of the heating coil of Fig. 1;

Fig. 3 is a plan view of the heating coil shown in Fig. 2;

Fig. 4 is a cross section of one form of wire from which the chain links are formed to which the method of the present invention applies;

Fig. 5 is a plan view of one link of a chain to which, for example, the present invention applies;

Similar reference characters indicate corresponding parts throughout the several views of the drawings.

Figure 6:
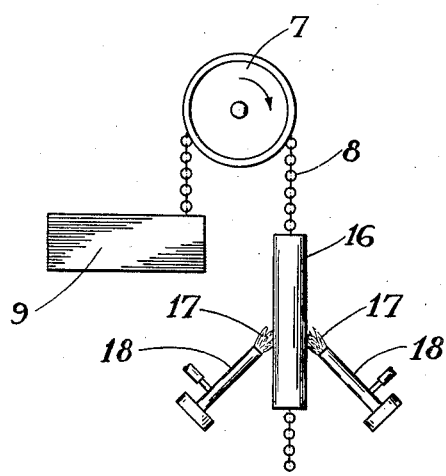
Fig. 6 is a schematic drawing of another apparatus suitable for the method of this invention.

In the chain making industry, especially as regards chain made for jewelry purposes, it is customary practice to form the chain on automatic chain-making machinery. Such machinery processes wire into chain with closed but unsoldered or unbrazed links. Since the abutting ends of a link of such a chain are not soldered together by the chain-making machinery, it is, therefore, necessary to perform a soldering or brazing operation on each link in order securely to fasten these ends together, and thus furnish a strong link. It is often the practice to use a solder-cored wire, so as to eliminate the necessity of external application of solder. The chain is dipped in a flux which dries on the chain in order to facilitate proper soldering. However, even with solder-cored chain wire, the solder has a tendency to flow outside the joint and the links themselves may become soldered together instead of being free of each other. To prevent this, it has also been customary to coat the chain with a substance, generally graphite in powder form, or a heavy graphite-oil mixture, after fluxing but prior to soldering, in order to confine the solder to the joint. These coatings are objectionable from the viewpoint of dirt and expense, and have the additional disadvantage that after the soldering, the whole chain must undergo a cleaning and pickling operation to remove respectively the graphite and flux. Such operations also add expense to such manufacture.

In this invention, the use of such relatively expensive and dirty coatings is eliminated, and also the necessity of subsequent cleaning and pickling operations. With the exception of a slight film of oil, the chain enters the soldering operation clean, and emerges clean.

As a preferred part of this method, the invention contemplates the use of induction heating as one of the steps therein. By the use of such heating, very rapid soldering is accomplished, with an important saving of time.

Basically, the steps of the invention are as follows: First, the chain (made from solder-cored wire) is coated with a thin film of oil. The oil may contain a small trace of colloidal graphite, or some other non-metallic solid. The amount of the solid is small as compared to the oil, being of the order of a few percent or less by weight. For example, the use of a fraction of a percent of the solid has been found to be satisfactory, where the solid is colloidal graphite. The amount used is not critical. The use of the colloid is optional, but better results are obtained with it than without it. Second, the oiled chain is heated to the melting point of the solder while the chain is surrounded by a tube or cylinder of not much larger diameter (internal) than the maximum size of the chain links. Third, during the heating, the oil is vaporized by heat. (It is believed that the resulting vapors, being confined in the small space surrounding the chain, act as a reducing atmosphere during the soldering, and thus the chain carries with it during the soldering, its own source of reducing atmosphere.) Fourth, the heating is continued until the solder flows properly to fill the joint to be soldered, and the chain links are then cooled to room temperature.

Referring now to the drawings, in Fig. 1 is shown schematically an arrangement that has proved satisfactory. A source of high frequency current, such as a high frequency oscillator indicated generally at 1, is connected, in accordance with usual high frequency induction heating practice, to the work coil 2 by means of the leads 3. Since the design of the oscillator is not a part of this invention and follows standard well-known practice in the art, none of the details of its construction are herein given.

The work coil 2 is constructed of copper tubing, through which water may be passed for cooling purposes. As shown in Fig. 2, the work coil closely surrounds a tube 4 which serves two purposes: One purpose is to act as an electrical insulator to prevent the chain which passes through the center of the coil, from coming in contact with the turns of the work coil. The second purpose is to provide a small confined space 5, through which the chain must pass, the space being of such size in relation to the chain, that when the oil on the chain becomes vaporized, the resulting vapors and gases are held in close proximity to the chain, and furnish an atmosphere reducing enough (and fluxing enough) for proper soldering. To this end, the sleeve 4 is provided with an internal bore 6 of size just large enough to permit the chain to pass therethrough. As an example, for chain with circular links made of 0.025 inch diameter wire and 0.125 inch in outside diameter, the bore 6 is approximately 0.180 inch in diameter. Sleeve 4 may be of fused quartz, or some other heat resisting, electrical insulating, material.

A conveyor wheel 7 is mounted in such position with respect to the top of bore 6 that chain 8 which passes around wheel 7 so as to be conveyed thereby as the latter is turned in the direction indicated by the arrow, is readily fed into bore 6 and thus through the work coil 2. Wheel 7 may be turned manually, but preferably is motor driven, so that the chain 8 may be fed continuously at a constant speed through the work coil 2. In this way, for a given-type of chain, once the correct power input to coil 2 is determined, and the correct speed of travel of the chain is ascertained for correct soldering (both by experiment, since both factors vary with chain size), then the proper soldering conditions may be thereafter reproduced at will for the given chain.

A container or pan 9 may be located under the other side of wheel 7 and the chain which is to be soldered may be coiled in pan 9 so as readily to feed up over wheel 7 and be conveyed thereby when the latter turns. In this invention, it is also contemplated that instead of pan 9, the chain may feed directly from an automatic chain-making machine over wheel 7 and hence into coil 2. In such case, the speed of soldering must be adjusted to the speed with which the chain emerges from the chain-making machine. After emerging from the work coil 2, the chain may be wound on a reel for any subsequent handling. In some cases it has been found desirable to allow the chain to drop into a receptacle mounted immediately below the exit end of tube 4, and thus relieve tension on the chain as it emerges.

In Fig. 3 is shown a plan view of the coil 2 with sleeve 4 mounted therein.

By using a thin-wall tube, the turns of the work coil 2 may be brought close to the axis of the tube, and the chain, and thus maximum field concentration at the center may be obtained.

Fig. 4 shows, as an example, a type of solder-cored wire suitable for this invention. Here, 10 is an exterior layer of precious metal such as gold or silver, 11 is a base metal interior core, and 12 is the central core of solder which may be any of the well-known types of silver or gold solders. Such solder-cored wires are well known in the art. In some types of chain wire, the base metal 11 is eliminated, and the wire will then consist of precious metal with a solder core. Either type is suitable for this invention.

In Fig. 5 is shown, as an example, a link 10 of chain to be soldered. In this case, the link is circular in cross section, with the free ends 13 and 14 being bent so as to be closely adjacent or abutting to each other. When the solder core is melted so as to flow, it flows outwardly, filling the joint made by ends 13—14.

As mentioned above, it is believed that the volatile gases from the oil act as an inert or reducing atmosphere and thus prevent oxidation of the parts to be soldered. However, it is not known why the oil alone seems to confine the solder to the ends to be joined and to prevent the solder from creeping outside the joint with resultant soldering together of two links. It may be that there is a small percentage of ash left deposited on the chain on vaporization of the oil, which ash acts as a stopper. As mentioned above, the addition of a small amount of colloidal graphite to the oil, or some other inert non-metallic solid, will improve the soldering from the viewpoint of preventing creeping of the solder outside the joint.

It is to be noted that in this method, the chain, as it emerges from the work coil as shown at 15, is clean and bright, even though there has been added a small amount of graphite to the oil. No further cleaning or pickling operations are necessary, as compared to former methods using fluxes or heavy graphite deposits, except possibly a simple wiping with a soft cloth.

With this invention it has been found possible to solder these links very rapidly and economically, and with a minimum of so-called "stiff" links.

Figure 7:
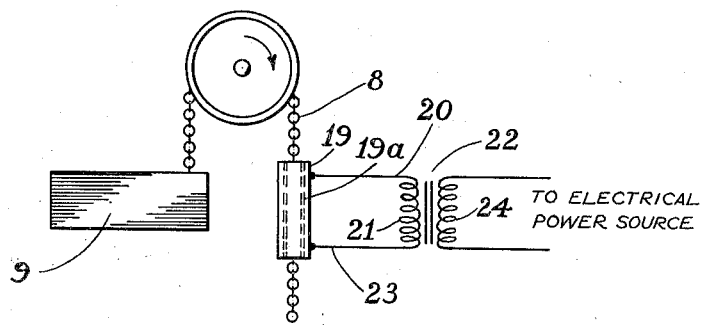
Fig. 7 is a schematic drawing of another apparatus suitable for the method of this invention.

Instead of the use of high frequency current, as in induction heating, other means of heating may be used, as for example gas flames or the passage of current through a metal sleeve. Figs. 6 and 7 show respectively, these two alternatives. In both cases, a metal tube is heated to incandescence and the chain passing through the bore thereof is heated to soldering point by radiation and convection.

In Fig. 6, 16 is a metal tube comparable in size to the sleeve 4. Tube 16 is mounted vertically, and is heated to incandescence by the flames 17 of gas burners 18. A conveyor wheel 7 is again used to feed the chain into the bore of tube 16.

In Fig. 7, the tube 19 is again of metal and is heated to incandescence by means of the passage of electric current therethrough. For example, an electrical connection 20 is made between one end of the tube 19 and one side of the secondary winding 21 of transformer 22. The other side of winding 21 is connected by wire 23 to the other end of tube 19. The primary side 24 of transformer 22 is connected to a power source. Transformer 22 is so designed that from the secondary is derived a high current, the current being sufficient to heat tube 19 to the proper degree of incandescence. It may be found necessary, in this case, to mount an inner tube 19a within tube 19, in order to prevent the chain 8 from short circuiting the tube 19, tube 19a in such case being made of a heat resisting electrical insulating material such as fused quartz.

The temperature of tubes 16 and 19 is a matter to be determined by experience and depends on the size of chain, the speed of chain passing through the tube, and the diameter of the tube, and the length of the heated portion thereof.

In each case, tubes 16 and 19 are preferably made of metal which is somewhat resistant to oxidation, such as nickel or Nichrome, etc.

As many changes could be made in the above methods without departing from the scope of the invention, it is intended that all matter contained in the above description shall be interpreted as illustrative and not in a limiting sense.

We claim:

1. In the manufacture of chain consisting of links formed of wire having an exterior metal layer surrounding a solder core, and wherein each link is initially formed with contiguous ends to be soldered together, the method of soldering together the ends of the links comprising the steps of coating the chain with a film of oil, feeding the oil-coated chain through an elongate, open-ended, restricted passageway only slightly wider than the links of the chain, heating the links traveling through the passageway to a temperature sufficient to melt the solder in the links and to vaporize the oil without appreciable deposition of carbon on the links, thereby providing a protective oil-vapor atmosphere around the heated links in the passageway to prevent oxidation of the links while removing the oil from the links so that they emerge from the passageway clean and bright.

2. The method of claim 1, wherein the oil carries a non-metallic solid in amount insufficient noticeably to coat the links upon vaporization of the oil.

3. The method of claim 1, wherein the oil carries a trace of colloidal graphite in amount less than 1%.

4. The method of claim 1, wherein heating of the links is accomplished by inducing high-frequency current therein as they travel through the passageway.

GEORGE DURST.
JACK C. VAN RYN.

REFERENCES CITED

The following references are of record in the file of this patent:

UNITED STATES PATENTS

| Number | Name | Date |
| --- | --- | --- |
| 2,084,268 | Quarnstrom | June 15, 1937 |
| 2,197,191 | Nichols et al. | Apr. 16, 1940 |
| 2,237,309 | McMinn | Apr. 8, 1941 |
| 2,374,634 | Wile | Apr. 24, 1945 |